US012578808B2

(12) United States Patent
Li

(10) Patent No.: US 12,578,808 B2
(45) Date of Patent: Mar. 17, 2026

(54) SMART MOUSE DEVICE, SMART SYSTEM AND OPERATING METHOD THEREOF

(71) Applicant: PIXART IMAGING INC., Hsin-Chu County (TW)

(72) Inventor: Jr-Yi Li, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 1 day.

(21) Appl. No.: 18/607,578

(22) Filed: Mar. 18, 2024

(65) Prior Publication Data

US 2025/0291432 A1    Sep. 18, 2025

(51) Int. Cl.
*G06F 3/0354* (2013.01)
(52) U.S. Cl.
CPC ................................. *G06F 3/03543* (2013.01)
(58) Field of Classification Search
CPC .................................................. G06F 3/03543
See application file for complete search history.

(56) References Cited

U.S. PATENT DOCUMENTS

2004/0239637 A1* 12/2004 Williams .............. G06F 3/0238
345/172
2006/0097987 A1* 5/2006 Hughes ............... G06F 3/03543
345/156

2006/0152495 A1* 7/2006 Gombert ............... G06F 3/0486
345/172
2008/0278354 A1* 11/2008 Garrett ................... H03M 11/06
341/32
2011/0028194 A1* 2/2011 Tang ..................... G06F 3/0238
345/172
2011/0084904 A1* 4/2011 Tan ........................ G06F 3/0238
711/E12.001
2011/0244961 A1* 10/2011 Soelberg ............... A63F 13/211
463/32
2015/0169087 A1* 6/2015 Kim ...................... G06F 1/1626
345/166
2015/0355733 A1* 12/2015 Chang ................. G06F 3/03543
345/163
2019/0083882 A1* 3/2019 Soelberg ................. A63F 13/42

* cited by examiner

*Primary Examiner* — Ariel A Balaoing
(74) *Attorney, Agent, or Firm* — HAUPTMAN HAM, LLP

(57) ABSTRACT

There is provided a smart system adopting a smart mouse device, including a training phase and an operation phase. In the training phase, the smart system performs a model training according to parameters including user operations on input devices and selected functions on software interfaces under different operation scenarios, and a trained inference model is recorded in the smart mouse device. In the operation phase, the inference model automatically assigns operating functions of the mouse key, displacement and mouse roller according to a current operation scenario to allow the mouse key, displacement and mouse roller to have different operating functions corresponding to different operation scenarios.

19 Claims, 5 Drawing Sheets

500

100

500

SMART MOUSE DEVICE, SMART SYSTEM AND OPERATING METHOD THEREOF

FIELD OF THE DISCLOSURE

This disclosure generally relates to a smart system and, more particularly, to a smart mouse device, a smart system and an operating method thereof that infers and defines operating functions of a key of a mouse device according to a current process, a current URL or a current window title to allow the key of the mouse device to have different operating functions corresponding to different operation scenarios.

BACKGROUND OF THE DISCLOSURE

The gaming mouse generally has multiple keys which can be assigned with different commands, functions and macros by using a software interface. However, when a user plays different games, the previously assigned commends, functions and macros may not be suitable for a next game. Therefore, the user needs to use the software interface again to reassign new commends, functions and macros. It is very troublesome.

Therefore, it is required to provide a mouse device that can deal with this troublesome work.

The information disclosed in the Related Art herein is merely intended to increase understanding of the general background of the invention and should not be taken as an admission or in any way implied that the relevant information constitutes prior art that is already known to a person of ordinary skill in the art.

SUMMARY

Accordingly, the present disclosure provides a mouse device that automatically assigns operating functions to mouse keys (e.g., B4 and B5, but not limited to), calculated displacement (e.g., DPI values, but not limited to) and a mouse roller (e.g., playing speed of audio and video, but not limited to) in response to different operation scenarios.

The present disclosure provides a mouse device that can recognize a current operation scenario such as a process, a URL or a window title, and automatically assign operating functions to a mouse key, displacement and a mouse roller thereof in response to different operation scenarios.

The present disclosure provides a system adopting a smart mouse device. The system uses, in a training phase, an artificial intelligent (AI) algorithm to perform the training on parameters including user inputs to an input devices (e.g., including touchpad, keyboard and mouse device) and selected functions on software interfaces under different processes, URLs and window titles to build up an inference model. The inference result of the inference model is recorded in a memory of the smart mouse device such that the smart mouse device may automatically assign operating functions to the mouse key, displacement and mouse roller in an operation phase.

The present disclosure provides a smart mouse device including an I/O interface, a key and a processor. The I/O interface is configured to receive a signal associated with an operation scenario. The key is configured to output a function signal to the I/O interface upon being operated. The processor has an inference model configured to load an assigned key function to a register associated with the key according to the signal associated with the operation scenario, wherein the inference model is configured to automatically assign different key functions in response to different operation scenarios.

The present disclosure further provides a smart system including a host and a smart mouse device. The host is configured to construct, in a training phase, an inference model corresponding to different operation scenarios, and detect a current operation scenario in an operation phase to output a signal associated with the current operation scenario. The smart mouse device is configured to receive the inference model and the signal associated with the current operation scenario from the host via an I/O interface, the inference model configured to load, in the operation phase, an assigned key function to a register associated with a key according to the signal associated with the current operation scenario, wherein the inference model is configured to automatically assign different key functions in response to different operation scenarios.

The present disclosure further provides an operating method of a smart system. The smart system includes a host and a smart mouse device. The operating method includes the steps of: entering a training phase to use the host to construct, using an AI algorithm, an inference model based on user operations of different operation scenarios and store the inference model into the smart mouse device; and entering an operation phase to use the smart mouse device to receive a signal of a current operation scenario from the host and load an assigned key function to a register associated with a key, wherein the inference model automatically assigns different key functions in response to the different operation scenarios.

In the present disclosure, the training phase and the operation phase are switched by performing a predetermined method such as operating a predetermined button, a predetermined switch, executing a predetermined command or selecting in a software interface.

In the present disclosure, the term "automatically" refers to that the assignation of different key functions is directly determined and recorded by the inference model, and does not require a user to confirm, accept or agree the assigned result. More specifically, the user is not previously aware of the assigned function to a key, but the user is informed of the assigned function via a software interface shown on a screen.

BRIEF DESCRIPTION OF DRAWINGS

Other objects, advantages, and novel features of the present disclosure will become more apparent from the following detailed description when taken in conjunction with the accompanying drawings.

DETAILED DESCRIPTION OF THE DISCLOSURE

It should be noted that, wherever possible, the same reference numbers will be used throughout the drawings to refer to the same or like parts.

One objective of the present disclosure is to provide a smart mouse device, a smart system adopting the smart mouse device and an operating method thereof that automatically assign different executing/operating functions to the mouse key (e.g., B4 and B5 key), the mouse roller and the detected displacement in response to different operation scenarios, which include different processes, URLs and window titles.

Figure 1:
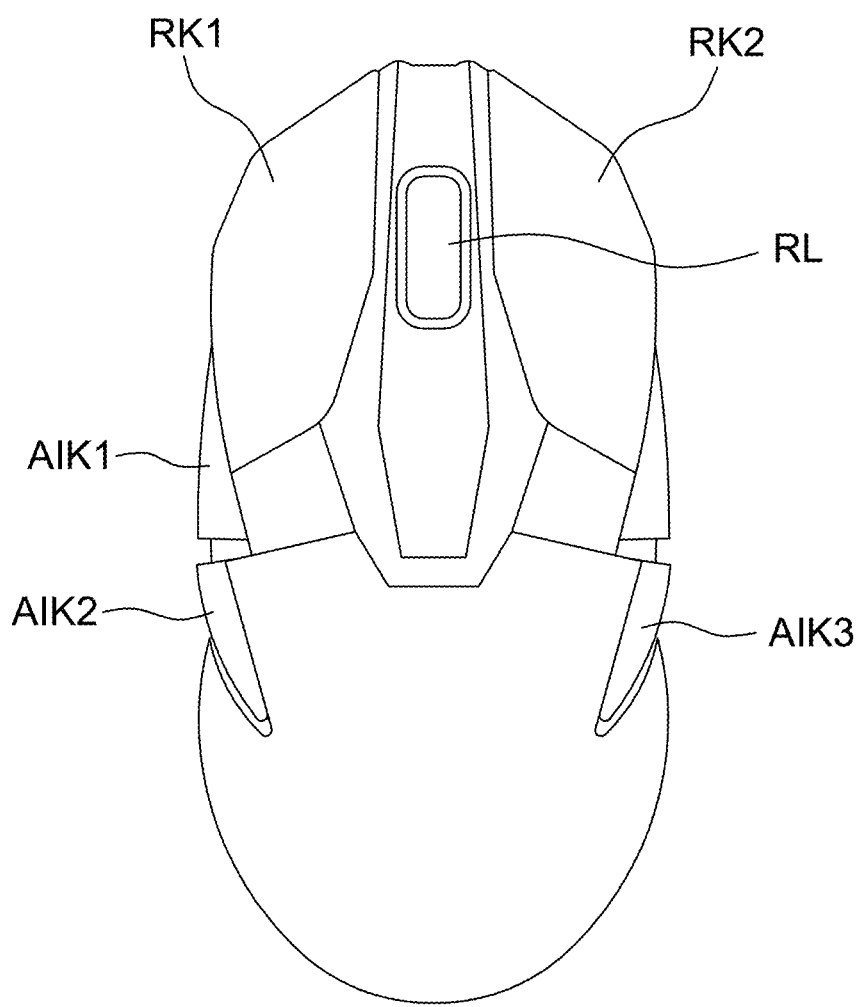
FIG. 1 is a schematic diagram of a smart mouse device according to one embodiment of the present disclosure.

Please refer to FIG. 1, it is a schematic diagram of a smart mouse device 100 according to one embodiment of the present disclosure. The smart mouse device 100 includes regular keys RK1 and RK2 (e.g., left key and right key), a mouse roller RL and smart keys AIK1, AIK2 and AIK3. Positions of the keys are not limited to those shown in FIG. 1. In the present disclosure, the regular keys RK1 and RK2 are referred to the mouse keys unable to be reassigned with different key functions, and the smart keys AIK1, AIK2 and AIK3 are referred to the mouse keys capable of being assigned with different key functions in response to different operation scenarios. In other aspects, all keys/buttons of the smart mouse device 100 are smart keys, and the present disclosure is not limited to that shown in FIG. 1.

Figure 2:
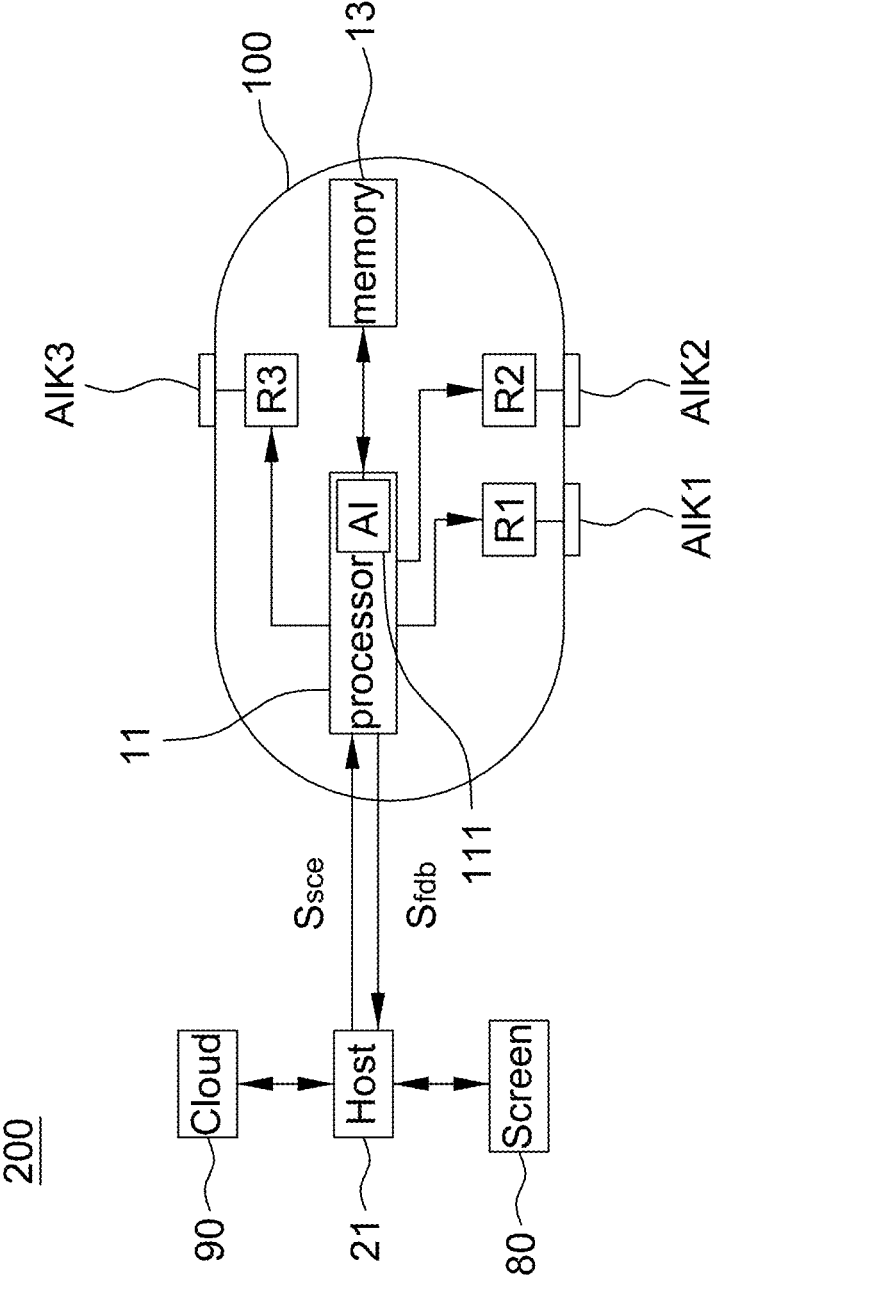
FIG. 2 is a schematic block diagram of a smart system adopting a smart mouse device according to one embodiment of the present disclosure.

Please refer to FIG. 2, it is a schematic block diagram of a smart system 200 adopting a smart mouse device 100 according to one embodiment of the present disclosure. The smart system 200 includes a host 21, a screen 80 and a smart mouse device 100. FIG. 2 only shows smart keys AIK1, AIK2 and AIK3 of the smart mouse device 100 and omits the regular keys for simplifying the drawing.

The host 21 is a computer device that is controlled by a mouse device (e.g., controlling a cursor, icon selection, but not limited to), e.g., a notebook computer, a desktop computer, a work station or the like. According to a type of the host 21, the screen 80 is embedded in the host 21 or connected to the host 21 via a connection line. The smart mouse device 100 is coupled to the host 21 in a wired or wireless manner.

To cause the smart mouse device 100 to operate as described in the present disclosure, the host 21 connected to the smart mouse device 100 is preferably installed with a predetermined application software (or APP), which is downloaded from a portable storage device, a website or a cloud to be installed on the host 21. The method of installing an application software (or APP) on a host is known to the art and thus details thereof are not described herein.

Figure 5:
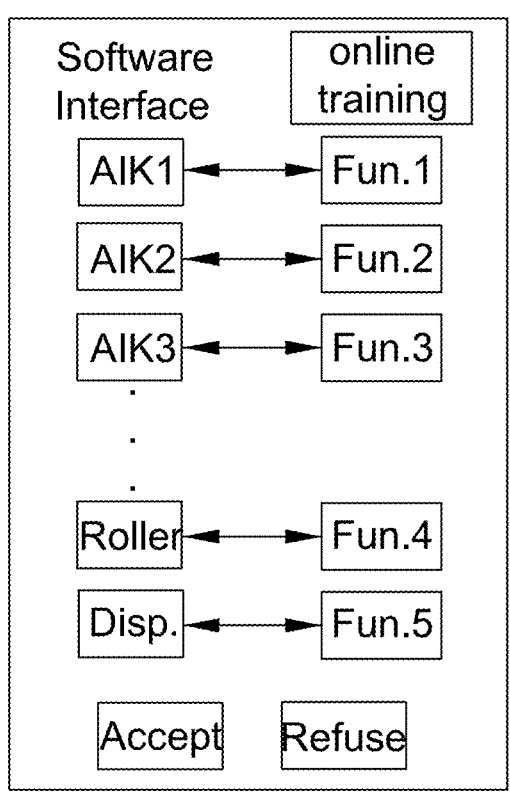
FIG. 5 is a schematic diagram of a software interface of a smart system according to a one embodiment of the present disclosure.

After the installation of the predetermined application software (or APP), the screen 80 shows a software interface 500 associated with the application software (or APP) when the predetermined application software (or APP) is running, referring to FIG. 5. For example, the software interface 500 respectively shows different key functions and operating functions assigned to each key (e.g., AIK1 to AIK3), a mouse roller RL and a detected displacement of the smart mouse device 100. The detected displacement is obtained using conventional method (e.g., calculating correlation between two image frames, but not limited to), and thus details thereof are not described herein.

In the present disclosure, the key functions include at least one of a function of running a macro, a function of key combination, a function of multiple clicks, a function of selecting dots per inch (DPI) and a function of long press.

The macro may be executed is determined according to previously recorded macro content.

The function of key combination includes a temporal combination (e.g., sequentially pressing different keys) and a spatial combination (e.g., pressing different keys simultaneously) of keyboard keys and/or mouse keys. For example, when a user operates one assigned mouse key, it is able to generate a function signal identical to operating a combination of keyboard keys and/or mouse keys.

The function of multiple clicks includes clicking multiple times on the keyboard keys and/or mouse keys. For example, when a user operates one assigned mouse key once, it is able to generate a function signal identical to operating one or multiple keyboard keys and/or mouse keys for multiple times.

The function of long press includes executing various functions of the mouse roller, keyboard keys and/or mouse keys by a single long press. For example, when a user presses (without releasing) one assigned mouse key, a function signal associated with a first function (e.g., operating at least one of keyboard keys and/or mouse keys, mouse roller and displacement) is firstly generated, and when a pressing time exceeds a predetermined time interval, a function signal associated with a second function (e.g., operating at least another one of keyboard keys and/or mouse keys, mouse roller and displacement) is then generated. It is possible to set multiple time thresholds to allow the user to generate a function signal of combining multiple operations of the keyboard keys and/or mouse keys, mouse roller and displacement by continuously pressing on a single mouse key.

In the present disclosure, the function signal herein includes a signal code stored in a register associated with the assigned mouse key, mouse roller and displacement. The signal code is recognizable by the predetermined application software that informs the operation system (OS) of the host 21 such that the host 21 runs corresponding control(s).

The function of selecting DPI includes selecting one operating DPI from multiple predetermined DPI values. For example, when a user operates one assigned mouse key once, the DPI value is step-up or step-down by one step. In another aspect, a long press of the assigned mouse key may change the DPI value by more than one step.

In the present disclosure, the assigned key function is used to perform a key operation, an icon function selection, a DPI adjustment, a selection of video screen size, a selection of playing speed for audio and video, and a menu selection suitable to the operation scenario, which is determined according to different operation scenarios operated by a user.

In one aspect, the host 21 constructs, in a training phase (or mode), an inference model corresponding to different operation scenarios. The operation scenario includes a process, a URL and a window title of the Microsoft window system. Please refer to FIG. 3, it is a flow chart of a training phase of a smart system 200 according to one embodiment of the present disclosure. In one aspect, the training phase is performed before shipment of the smart mouse device 100.

In a Step S31, the host 21 firstly collects input data, including operation scenarios and user operations. As mentioned above, the operation scenario includes a currently running process, e.g., including Csgo, Word, Photoshop, Visual studio, VLC Media Player, Zoom, Trello or the like; a currently running URL, e.g., including Google map, Youtube, ChatGPT, Netflix, Facebook or the like; and a current window title of the window system run on the host 21. For example, when the screen 80 shows multiple windows at the same time, the window title is a title of a currently focused window among the multiple windows. The user operations include the user's key operation, an icon function selection, a DPI selection, a selection of video screen size, a selection of playing speed for audio and video, and a menu selection, which are also the key functions may be assigned, suitable to the operation scenario under the current operation scenario. These input data are used as training data of the artificial intelligent (AI) algorithm for construction the inference model.

In a Step S32, the training data is pre-processed, e.g., including data normalizing and feature extraction, but not limited thereto. It is possible to perform the pre-processing of the training data using the way known to the art without particular imitations.

In a Step S33, the AI algorithm is used to construct an inference model based on the pre-processed training data. The AI algorithm includes, but not limited to, a Multilayer Perception (MLP) and a Convolutional Neural Network (CNN) to execute the training method such as majority class prediction, time series forecasting, clustering and recommendation system to build up the inference model and model parameters thereof.

For example, the majority class prediction is used to construct a model regarding the mostly used operations by the user; the time series forecasting is used to construct a model regarding the mostly used operations within some time intervals by the user; and the clustering is used to construct a model regarding the mostly used operations within a desired cluster (e.g., suitable operations) by the user. Different training method may build up different models and model parameters. When multiple training methods are used, the competition technique is used to determine which model is the most suitable model.

In a Step S34, next the inference model constructed in the Step S33 is verified (e.g., including checking the training threshold) and tuned (e.g., including tuning parameters) till the training threshold is satisfied. It is possible to use the method already known to the art to perform the verifying and Tuning in order to obtain the optimum model.

In a Step S35, the verified and tuned inference model is transferred to the smart mouse device 10 to be stored/recorded therein, e.g., FIG. 2 showing that the inference model being stored in in the processor 11 as an AI engine 111.

In another aspect, the smart system 200 uses the AI algorithm on the cloud 90 to generate the inference model. That is, the host 21 transmits the pre-processed data in the Step S32 onto the cloud 90 for constructing the inference model. After receiving the constructed inference model (including model parameters) from the cloud 90, the host 21 stores the constructed inference model (including model parameters) into the smart mouse device 100.

Figure 4:
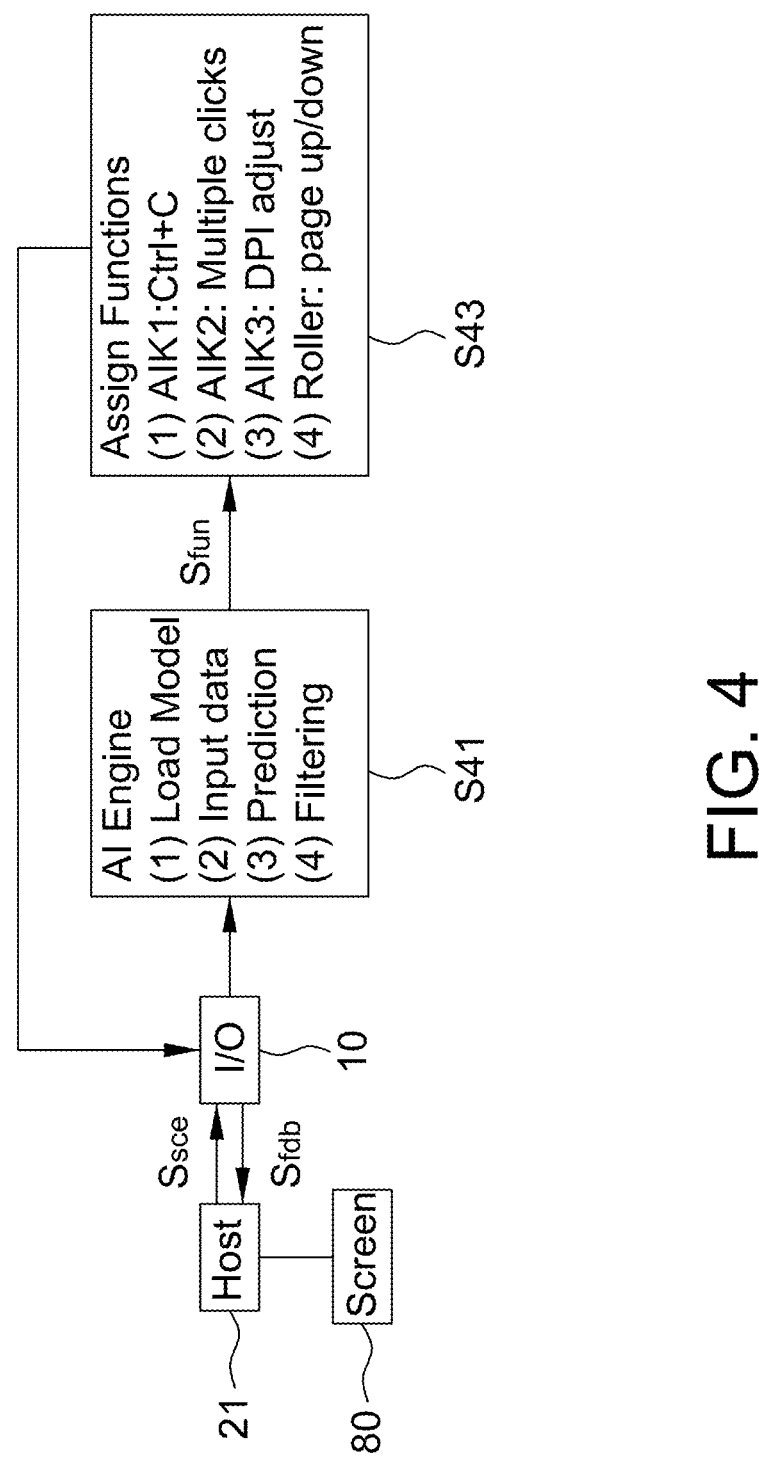
FIG. 4 is a flow chart of an operation phase of a smart system according to one embodiment of the present disclosure.

In one aspect, in the procedure that a user is installing the predetermined application software on the host 21, the host 21 transmits the inference model (including model parameters) into the smart mouse device 100 via the input/output interface 10 (e.g., USB interface, wireless interface, but not limited to), referring to I/O shown in FIG. 4.

Please refer to FIG. 4, it is a flow chart of an operation phase (or mode) of a smart system 200 according to one embodiment of the present disclosure. For example, the operation phase is entered after the host 21 is installed with the predetermined application software and the smart mouse device 100 is connected to the host via the I/O interface 10.

In the operation phase, the host 21 detects a current operation scenario and outputs a signal associated with the current operation scenario Ssce. The smart mouse device 100 receives the signal associated with the current operation scenario Ssce via the I/O interface 10. The inference model, used as the AI engine 111, is used to load an assigned key function to a register associated with a key according to the signal associated with the operation scenario Ssce.

For example in FIG. 2, the register R1 is used to record a function signal to be outputted to the I/O interface 10 when the smart key AIK1 is operated; the register R2 is used to record a function signal to be outputted to the I/O interface 10 when the smart key AIK2 is operated; and the register R3 is used to record a function signal to be outputted to the I/O interface 10 when the smart key AIK3 is operated. The function signals are sent to the host 21 via the I/O interface 10, and the predetermined application software in the host 21 accomplishes the decoding and informs the OS to perform corresponding controls.

In Steps S41 and S43, after entering the operation phase, the smart mouse device 100 loads the inference model (e.g., in the RAM) and receives input data, e.g., including the signal associated with a current operation scenario Ssce. The inference model assigns (e.g., by sending a signal Sfun) key functions to the smart keys AIK1, AIK2 and AIK3, e.g., becoming effective after the inferring result is stored in the memory 13 and loaded into the registers R1 to R3.

In the present disclosure, when identifying that a current operation scenario is not used as the training data in the training phase, the inference model further predicts the operating functions associated with the current operation scenario (e.g., referencing to similar operation scenarios used as training data), and identifies whether the prediction is reasonable or not using a filtering procedure. The reasonable prediction is assigned to the smart keys AIK1, AIK2 and AIK3, the detected displacement and the mouse roller RL, i.e. loading into corresponding registers.

Information of the assigned functions done in the Step S43 is sent to the host 21 via the I/O interface 10. The host 21 shows the assigned key functions on the screen 80 via the predetermined application software, e.g., referring to the software interface 500 shown in FIG. 5.

In another aspect, the predetermined application software performs the inference and then the inferred result becomes effective after being stored into the memory 13 and loaded in the registers R1 to R3. That is, the inference model is recorded in the host 21 instead of being recorded in the smart mouse device 100.

In this way, the inference model assigns different key functions in response to different operation scenarios such that a user needs not to re-assign key functions corresponding to different operation scenarios and thus the user experience is improved.

As mentioned above, the inference model further assigns different operating functions to the mouse roller RL in response to different operation scenarios. The smart mouse device 100 further has a register associated with the mouse roller RL. The inference model further assigns different operating functions to the detected displacement in response to different operation scenarios, e.g., including different DPI values and different snap angles. The smart mouse device 100 further has a register associated with the detected displacement.

For example, when the operation scenario is a URL named "Google Map", the detected displacement of the smart mouse device 100 is assigned with 1000 DPI (or CPI), the smart key AIK1 is assigned with a selection of satellite (i.e. Ctrl+Shif+1), the smart key AIK2 is assigned with a selection of traffic (i.e. Ctrl+Shif+2), and the mouse roller RL is assigned with functions of zoom-in/zoom-out.

For example, when the operation scenario is a URL named "Netflix", the smart key AIK1 is assigned with a selection of full screen, the smart key AIK2 is assigned with a selection of Pause/Play, and the mouse roller RL is assigned with functions of play-forward/play-backward by predetermined seconds (e.g., 10 to 20 seconds, but not limited to). Because it is generally not required to move the smart mouse device 100 in watching a video, the detected displacement of the smart mouse device 100 is not assigned with any operating function, but not limited to.

For example, when the operation scenario is a game named "CSGO", the detected displacement of the smart mouse device 100 is assigned with 400 DPI (or CPI), the smart key AIK1 is assigned with a Jump Through function (e.g., a game command), the smart key AIK2 is assigned with a Radar Zoom function (e.g., another game command), and the mouse roller RL is assigned with functions of mwheelup+jump/mwheeldown+jump (e.g., game commands).

Figure 3:
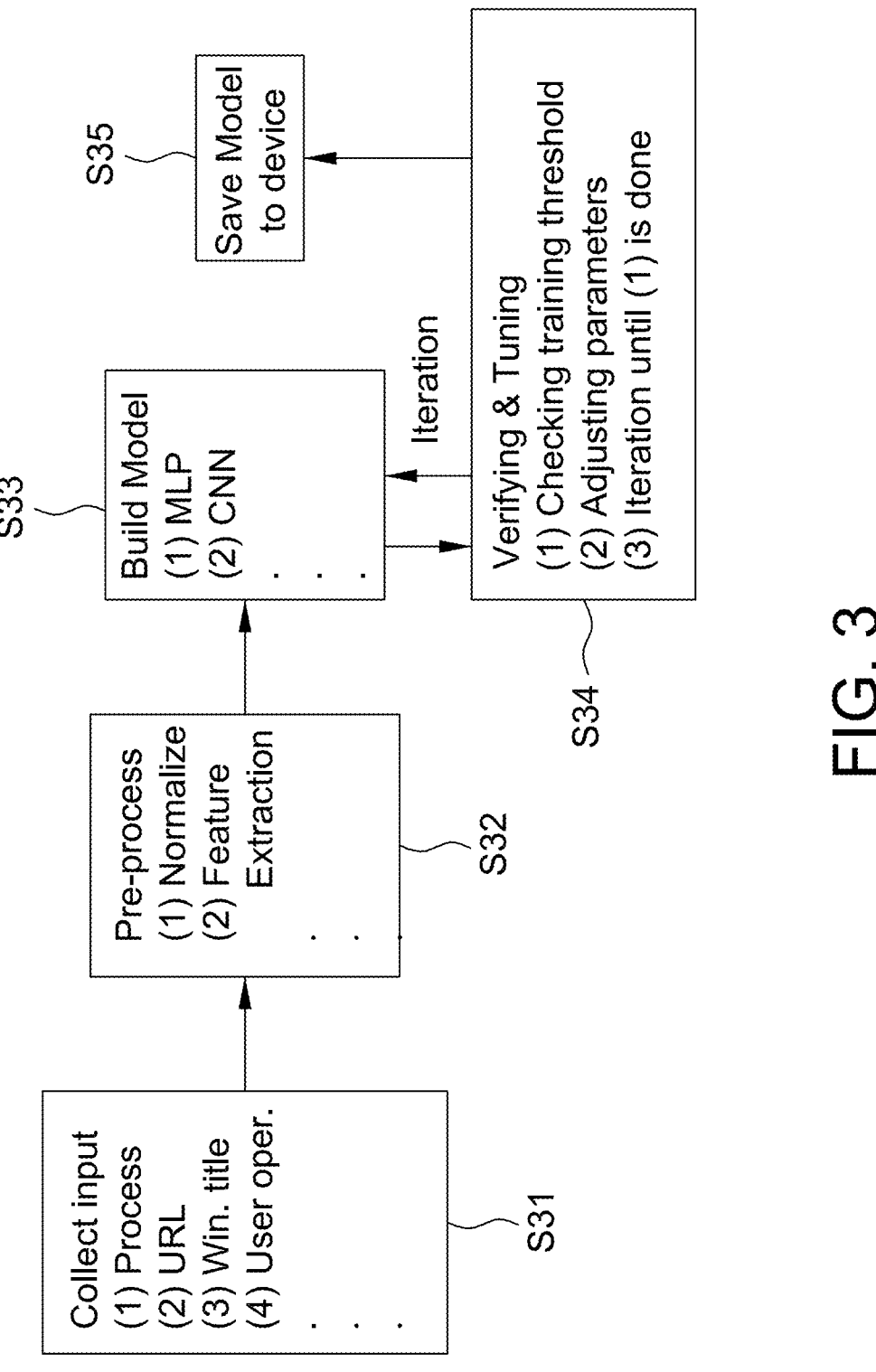
FIG. 3 is a flow chart of a training phase of a smart system according to one embodiment of the present disclosure.

As mentioned above, an operating method of the smart system 200 of the present disclosure includes a training phase and an operation phase. After entering the training phase, the host 21 constructs, using an AI algorithm, an inference model (including model parameters thereof) based on user operations of different operation scenarios, and stores the inference model (including model parameters thereof) into the smart mouse device 100, as shown in FIG. 3. After entering the operation phase, the smart mouse device 100 receives a signal of a current operation scenario Ssce from the host 21, and loads an assigned key function to a register (e.g., R1 to R3) associated with a key (e.g., AIK1 to AIK3), wherein the inference model automatically assigns different key functions in response to the different operation scenarios. As mentioned above, the operating functions of the mouse roller RL and the detected displacement are also assigned in the operation phase.

In one aspect, a software interface 500 of the predetermined application software has function selections (e.g., shown once corresponding to each operation scenario, but not limited to) that can allow a user to determine whether to accept or reject the operating functions assigned by the inference model, e.g., referring to FIG. 5. When the user selects "Accept", every assigned function is enabled; whereas, when the user selects "Refuse", the processor 11 sends a feedback message Sfdb to the host 11 via the I/O interface 10 to cause the host 21 to adjust the inference model. That is, default values of the operating function are changeable. In the present disclosure, the selections of "Accept" and "Refuse" are optional.

In one aspect, the software interface 500 of the predetermined application software further has a function selection of "online learning" that allows the inference model to adjust different operation functions according to the user's operations in the operation phase so as to realize the personalized learning. In one aspect, the result of the "online learning" is directly used to change the default values in the inference model.

The present disclosure further provides application software to be installed in a host 21. The application software is downloaded from a portable storage device, via a USB interface, via a wireless interface or from a cloud to the host 21 for being installed thereon. In running the installed application software, the screen 80 shows a software interface 500 (e.g., referring to FIG. 5). The software interface 500 shows operating functions respectively assigned to keys, roller and detected displacement of a mouse device (e.g., gaming mouse). The operating functions are automatically and adaptively changed in response to a current operation scenario of the host 21. The arrangement of the functions shown on the screen 80 is not limited to that shown in FIG. 5.

It should be mentioned that the examples of key combinations, assigned key functions, values (e.g., DPI value, a number of keys and a number of functions) and operation scenarios given herein are only intended to illustrate but not to limit the present disclosure. The key combinations, assigned key functions, values and operation scenarios may be personally adjusted based on actual operations of a user based on the setting by the user.

It should be mentioned that although the present disclosure describes the smart keys using buttons as an example, the present disclosure is not limited thereto. In other aspects, the smart keys are switches or knobs without particular limitations.

It should be mentioned that although the present disclosure is described in the way that the AI engine 111 is included in the processor 11 as an example, the present disclosure is not limited thereto. In other aspects, to reduce the computation of the processor 11, the AI engine 111 is included in a neural-network processing unit (NPU) or an application specific integrated circuit (ASIC) outside the processor 11.

As mentioned above, while operating a gaming mouse, a user generally uses different keys or different key combinations corresponding to different games, different roles, different times or different scenes, and thus the user needs to frequently open the associated application software to assign the key functions. It is very troublesome. Accordingly, the present disclosure further provides a smart mouse device (e.g., referring to FIG. 1), a smart system (e.g., referring to FIG. 2) and an operating method thereof (e.g., referring to FIGS. 3-4) that may automatically switch executing/operating functions assigned to the mouse key, mouse roller and displacement when the user is running different processes, URLs and window titles so as to improve the user experience. In addition, the user may refuse the assigned executing/operating functions to cause the AI algorithm to resign other groups of executing/operating functions, or the user may switch on an online learning function to cause the AI engine to build up a personalized executing/operating functions.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

The invention claimed is:

1. A smart mouse device, comprising:
an input/output (I/O) interface, configured to receive a signal associated with an operation scenario;
a key, configured to output a function signal to the I/O interface upon being operated; and
a processor, comprising an inference model configured to load an assigned key function to a register associated with the key according to the signal associated with the operation scenario,
wherein the inference model is configured to automatically assign different key functions in response to different operation scenarios,
the inference model is built up by an artificial intelligent algorithm to perform training on user operations of the different operation scenarios, and the smart mouse device further comprises an online learning function configured to cause the inference model to adjust the different key functions according to the user operations.

2. The smart mouse device as claimed in claim 1, wherein the operation scenario comprises a process, a URL and a window title, and the assigned different key functions are not further confirmed or agreed by a user.

3. The smart mouse device as claimed in claim 1, wherein the different key functions comprise at least one of a function of running a macro, a function of key combination, a function of multiple clicks, a function of selecting dots per inch (DPI) and a function of long press.

4. The smart mouse device as claimed in claim 1, further comprising a mouse roller, wherein the inference model is further configured to assign different operating functions to the mouse roller in response to the different operation scenarios.

5. The smart mouse device as claimed in claim 1, wherein the inference model is further configured to assign different operating functions to a detected displacement of the smart mouse device in response to the different operation scenarios.

6. The smart mouse device as claimed in claim 5, wherein the operating functions comprise at least one of different DPIs and different snap angles.

7. The smart mouse device as claimed in claim 1, wherein the assigned key function is configured to perform a key operation, an icon function selection, a DPI adjustment, a selection of video screen size, a selection of playing speed for audio and video, and a menu selection suitable to the operation scenario.

8. A smart system, comprising:
   a host, configured to construct, in a training phase, an inference model corresponding to different operation scenarios, and detect a current operation scenario in an operation phase to output a signal associated with the current operation scenario; and
   a smart mouse device, configured to receive the inference model and the signal associated with the current operation scenario from the host via an I/O interface, the inference model configured to load, in the operation phase, an assigned key function to a register associated with a key according to the signal associated with the current operation scenario,
   wherein the inference model is configured to automatically assign different key functions in response to different operation scenarios.

9. The smart system as claimed in claim 8, wherein the current operation scenario comprises a process, a URL and a window title.

10. The smart system as claimed in claim 8, wherein the host is configured to construct the inference model using an AI algorithm embedded therein or on a cloud.

11. The smart system as claimed in claim 8, wherein the different key functions comprise at least one of a function of running a macro, a function of key combination, a function of multiple clicks, a function of selecting DPI and a function of long press.

12. The smart system as claimed in claim 8, wherein the inference model is further configured to assign different operating functions to a mouse roller of the smart mouse device in response to the different operation scenarios.

13. The smart system as claimed in claim 8, wherein the inference model is further configured to assign different operating functions to a detected displacement of the smart mouse device in response to the different operation scenarios.

14. The smart system as claimed in claim 8, further comprising:
   application software, installed on the host; and
   a screen, configured to show a software interface of the application software, and the software interface configured to show the different key functions of the key.

15. The smart system as claimed in claim 8, wherein the assigned key function is configured to perform a key operation, an icon function selection, a DPI adjustment, a selection of video screen size, a selection of playing speed for audio and video, and a menu selection suitable to the operation scenario.

16. An operating method of a smart system, the smart system comprising a host and a smart mouse device, and the operating method comprising:
   entering a training phase to use the host to construct, using an AI algorithm, an inference model based on user operations of different operation scenarios and store the inference model into the smart mouse device; and
   entering an operation phase to use the smart mouse device to receive a signal of a current operation scenario from the host and load an assigned key function to a register associated with a key,
   wherein the inference model automatically assigns different key functions in response to the different operation scenarios.

17. The operating method as claimed in claim 16, further comprising:
   using the inference model to automatically assign different operating functions to a mouse roller of the smart mouse device in response to the different operation scenarios.

18. The operating method as claimed in claim 16, further comprising:
   using the inference model to automatically assign different operating functions to a detected displacement of the smart mouse device in response to the different operation scenarios.

19. The operating method as claimed in claim 16, wherein the current operation scenario comprises a process, a URL and a window title.

* * * * *